Jan. 19, 1954   N. L. ATTEBERRY   2,666,287
COMBINE PLATFORM HAVING ROTARY CUTTING MEANS
Filed Aug. 3, 1953
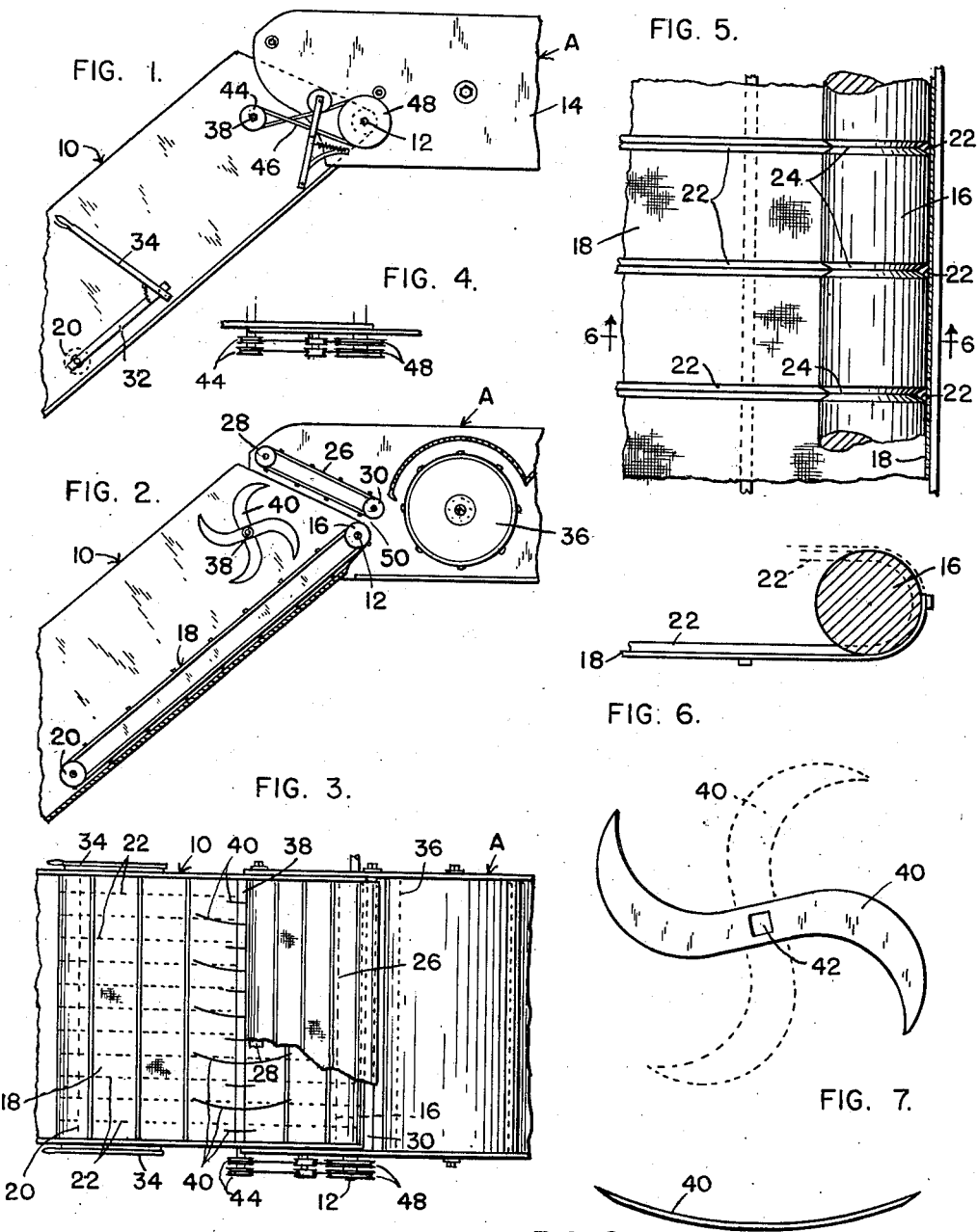
INVENTOR
NEWTON L. ATTEBERRY
BY
ATTORNEYS Patented Jan. 19, 1954

2,666,287

UNITED STATES PATENT OFFICE 2,666,287

COMBINE PLATFORM HAVING ROTARY CUTTING MEANS

Newton L. Atteberry, Mendon, Mo.

Application August 3, 1953, Serial No. 372,045

8 Claims. (Cl. 56—122)

The present invention relates to a grain separator or combine and may form part of such separator or combine when used for separating various kinds of grains.

An important object of the invention is to provide a cutting attachment for combines now on the market which prevents the clogging of the threshing cylinder under all conditions of use.

An additional object is to provide a cutter which is located immediately in front of the threshing cylinder.

A further object is to locate a cutter means in the angle formed by a pair of conveyors located in front of the threshing cylinder.

Another object is to provide a novel conveyor apron and drive means therefor, combined with a cutter located adjacent one end of the lower conveyor apron, and between this apron and an upper conveyor apron.

Other objects will appear hereinafter throughout the specification.

In the drawings:

Figure 1 is a side elevation partly broken away, of the combine;

Figure 2 is a vertical section of the structure shown in Figure 1;

Figure 3 is a top plan view of the structure shown in Figures 1 and 2;

Figure 4 is a top plan view partly broken away, of the roller adjusting mechanism and its mounting on the machine;

Figure 5 shows a plan, partly broken away, of the lower canvas apron and one of the canvas rollers;

Figure 6 is a section taken on the line 6—6 of Figure 5;

Figure 7 is a side elevation of one of the cutters, and showing in dotted lines another of the cutters; and Figure 8 is a plan view of the cutter shown in full lines in Figure 7.

In the drawings, the threshing and separating unit is designated by the letter A. Such unit may be of any suitable type, such as that illustrated in the patent to Oehler et al., 2,292,650, August 11, 1942, the same being illustrative of a conventional combine.

The harvester platform 10 is pivotally connected on shaft 12 to the harvester separating section 14. The shaft 12 mounts the roller 16 which is the upper roller of the lower canvas conveyor 18, the lower roller for which is shown at 20.

The usual power driven reel which rotates on an axis above the canvas conveyor as shown in said patent has been omitted for the purpose of clarity.

The lower canvas belt 18 is provided with a number of parallel, longitudinally mounted V-belts 22, eleven of such belts being shown in dotted lines in Figure 3, which belts engage V-grooves 24 on pulleys 16 and 20. Any number of belts and grooves may be provided in order to accurately maintain the belt in proper position on the pulleys at all times.

The upper canvas conveyor 26 is mounted on pulleys 28 and 30.

Both the upper and lower canvas conveyors are driven by power offtakes from the combine, as well as the reel (not shown).

The lower roller 20 is mounted on a line 32 pivoted to hand lever 34 to adjust the tension of the belt 18.

The combine is provided with a threshing cylinder 36, as well as the outer component separator parts that are not herein shown, but which forms part of the conventional combine.

Preferably mounted in the angle formed by the upper and lower canvas aprons 18 and 26 is a square shaft 38 on which are mounted in spaced relation a plurality of knives 40. These knives are dish-shaped as shown in Figures 7 and 8, and each has a square opening 42 for mounting on shaft 38.

The shaft is rotated by a driven pulley 44, belt 46 and drive pulley 48 as shown in Figure 1, mounted on the shaft 12 of the roller 16.

As the weeds, stalks and other material move up the lower canvas conveyor, they are chopped into small segments by the rotating cutters 40, which rotate at high speed, and which literally chop into small segments the weed and other stalks that are engaged by the cutters. Clogging at the throat 50 between the juxtaposed portions of the canvas conveyors 18 and 26, as well as in front of or about the threshing cylinder 36, is entirely prevented.

While a prefrred specific embodiment of the invention has been hereinbefore set forth, it is to be understood that the invention is not to be limited to the structure shown, because various modifications of the construction may be resorted to in putting the invention into practice, all within the purview of the appended claims. The drawings and specification are, therefore, to be understood as illustrative rather than limiting.

What I claim is:

1. In a combine, a first conveyor belt, said belt being upwardly and rearwardly inclined and having a front and a rear end, a second conveyor belt overlying said first belt, said second belt being rearwardly converging with relation to said first belt and having a front and a rear end, said rear end of said second conveyor belt being located adjacent the rear end of said first conveyor belt, and spaced therefrom, a threshing cylinder adjacent the said conveyor rear ends, and a rotating cutting means comprising a plurality of blades which are dish-shaped in cross section, said cutter means being located over said first conveyor belt and in front of said second conveyor belt and closely adjacent said conveyor belt rear ends, whereby the weeds and grain stalks carried by said first conveyor belt are chopped into small segments before entering the space between the rear ends of said conveyor belts.

2. In a combine, a first canvas belt forming a conveyor, said belt being upwardly and rearwardly inclined and having a front and a rear end, a second canvas belt forming a second conveyor and overlying said first conveyor, said second conveyor being rearwardly converging with relation to said first conveyor and having a front and a rear end, said rear end of said second conveyor being located adjacent the rear end of said first conveyor and spaced therefrom, a threshing cylinder adjacent the said conveyor rear ends, and a rotating cutting means comprising a plurality of blades which are dish-shaped in cross section, said cutter means being located over said first conveyor and in front of said second conveyor, and closely adjacent said conveyor rear ends, whereby the weeds and grain stalks carried by said first conveyor are chopped into small segments before entering the space between the rear ends of said conveyors.

3. In a combine, a first conveyor belt, said belt being upwardly and rearwardly inclined and having a front and a rear end, a second conveyor belt overlying said first belt, said second belt being rearwardly converging with relation to said first belt and having a front and a rear end, said rear end of said second conveyor belt being located adjacent the rear end of said first conveyor belt, and spaced therefrom, a threshing cylinder adjacent the said conveyor rear ends, and a rotating cutting means comprising a plurality of blades which are dish-shaped in cross section, said cutter means being located over said first conveyor belt and in front of said second conveyor belt and closely adjacent said conveyor belt rear ends, whereby the weeds and grain stalks carried by said first conveyor belt are chopped into small segments before entering the space between the rear ends of said conveyor belts, said cutter means being mounted on a shaft normally intermediate the ends of said second conveyor belt.

4. In a combine, a first canvas belt forming a conveyor, said belt being upwardly and rearwardly inclined and having a front and a rear end, a second canvas belt forming a second conveyor and overlying said first conveyor, said second conveyor being rearwardly converging with relation to said first conveyor and having a front and a rear end, said rear end of said second conveyor being located adjacent the rear end of said first conveyor and spaced therefrom, a threshing cylinder adjacent the said conveyor rear ends, and a rotating cutting means comprising a plurality of blades which are dish-shaped in cross section, said cutter means being located over said first conveyor and in front of said second conveyor, and closely adjacent said conveyor rear ends, whereby the weeds and grain stalks carried by said first conveyor are chopped into small segments before entering the space between the rear ends of said conveyors, said combine having a threshing cylinder, a shaft mounting said cylinder, and off-take drive means for driving both of said conveyors from said thresher shaft.

5. In a combine, a first canvas belt forming a conveyor, said belt being upwardly and rearwardly inclined and having a front and a rear end, a second canvas belt forming a second conveyor and overlying said first conveyor, said second conveyor being rearwardly converging with relation to said first conveyor and having a front and a rear end, said rear end of said second conveyor being located adjacent the rear end of said first conveyor and spaced therefrom, a threshing cylinder adjacent the said conveyor rear ends, and a rotating cutting means comprising a plurality of blades which are dish-shaped in cross section, said cutter means being located over said first conveyor and in front of said second conveyor, and closely adjacent said conveyor rear ends, whereby the weeds and grain stalks carried by said first conveyor are chopped into small segments before entering the space between the rear ends of said conveyors, said first conveyor having a plurality of substantially equally spaced V-belts on one side thereof and rollers mounting said first conveyor belt adjacent the ends thereof, said rollers having substantially equally spaced V-grooves adapted to be engaged by said V-belts on said conveyor.

6. In a combine, a first conveyor belt, said belt being upwardly and rearwardly inclined and having a front and a rear end, a second conveyor belt overlying said first belt, said second belt being rearwardly converging with relation to said first belt and having a front and a rear end, said rear end of said second conveyor belt being located adjacent the rear end of said first conveyor belt, and spaced therefrom, a threshing cylinder adjacent the said conveyor rear ends, and a rotating cutting means comprising a plurality of blades which are dish-shaped in cross section, said cutter means being located over said first conveyor belt and in front of said second conveyor belt and closely adjacent said conveyor belt rear ends, whereby the weeds and grain stalks carried by said first conveyor belt are chopped into small segments before entering the space between the rear ends of said conveyor belts, said first conveyor belt having a plurality of substantially equally spaced V-belts extending longitudinally of the same and spaced from each other, a plurality of pulleys for mounting the front and rear end of said first conveyor belt, said pulleys having substantially equally spaced V-grooves for receiving the V-belts of said first conveyor belt.

7. In a combine, a first canvas belt forming a conveyor, said belt being upwardly and rearwardly inclined and having a front and a rear end, a second canvas belt forming a second conveyor and overlying said first conveyor, said second conveyor being rearwardly converging with relation to said first conveyor and having a front and a rear end, said rear end of said second conveyor being located adjacent the rear end of said first conveyor and spaced therefrom, a threshing cylinder adjacent the said conveyor rear ends, and a rotating cutting means comprising a plurality of blades which are dish-shaped in cross section, said cutting means being located over said first conveyor and in front of said second conveyor, and closely adjacent said conveyor rear ends, whereby the weeds and grain stalks carried by said first conveyor are chopped into small segments before entering the space between the rear ends of said conveyors, said cutting means being located in the angle formed by said conveyor belts.

8. In a combine, a first canvas belt forming a conveyor, said belt being upwardly and rearwardly inclined and having a front and a rear end, a second canvas belt forming a second conveyor and overlying said first conveyor, said second conveyor being rearwardly converging with relation to said first conveyor and having a front and a rear end, said rear end of said second conveyor being located adjacent the rear end of said first conveyor and spaced therefrom, a threshing cylinder adjacent the said conveyor rear ends, and a rotating cutting means comprising a plurality of blades which are dish-shaped in cross section, said cutting means being located over said first conveyor and in front of said second conveyor, and closely adjacent said conveyor rear ends, whereby the weeds and grain stalks carried by said first conveyor are chopped into small segments before entering the space between the rear ends of said conveyors, said combine having a threshing cylinder, a shaft mounting said cylinder, and off-take drive means for driving both of said conveyors from said thresher shaft, said cutting means being located in the angle formed by said conveyor belts.

NEWTON L. ATTEBERRY.

References Cited in the file of this patent

UNITED STATES PATENTS

| Number | Name | Date |
|---|---|---|
| 746,429 | Wood, Jr. | Dec. 8, 1903 |
| 1,380,636 | Clove | June 7, 1921 |
| 1,419,926 | Heineke | June 20, 1922 |
| 2,497,298 | Currie | Feb. 14, 1950 |